US012683459B2

(12) United States Patent
Magana Cano et al.

(10) Patent No.: US 12,683,459 B2
(45) Date of Patent: Jul. 14, 2026

(54) METHODS AND APPARATUSES FOR REAL-TIME ROTOR BALANCING FOR A GENERATOR AND CONNECTED EQUIPMENT

(71) Applicant: GE Infrastructure Technology LLC, Greenville, SC (US)

(72) Inventors: Luis Fernando Magana Cano, Queretaro (MX); Gerardo Plata Contreras, Queretaro (MX); Abel Gracia Reyes, Queretaro (MX)

(73) Assignee: GE Infrastructure Technology, LLC, Greenville, SC (US)

( * ) Notice: Subject to any disclaimer, the term of this patent is extended or adjusted under 35 U.S.C. 154(b) by 289 days.

(21) Appl. No.: 18/523,277

(22) Filed: Nov. 29, 2023

(65) Prior Publication Data

US 2025/0175056 A1 May 29, 2025

(51) Int. Cl.
H02K 7/04 (2006.01)
H02K 7/108 (2006.01)
H02K 7/116 (2006.01)
H02K 7/18 (2006.01)
H02K 15/165 (2025.01)

(52) U.S. Cl.
CPC .............. H02K 7/04 (2013.01); H02K 7/108 (2013.01); H02K 7/116 (2013.01); H02K 7/1823 (2013.01); H02K 15/165 (2013.01)

(58) Field of Classification Search
CPC .......... H02K 7/04; H02K 7/108; H02K 7/116; H02K 7/1823; H02K 15/165; H02K 11/20; H02K 2213/09; H02K 7/12; G01M 1/22; G01M 1/28; G01M 1/36
See application file for complete search history.

(56) References Cited

U.S. PATENT DOCUMENTS

| | | | | | |
|---|---|---|---|---|---|
| 6,210,099 | B1 * | 4/2001 | Hugbart | ................. | F16F 15/36 73/485 |
| 7,985,055 | B2 * | 7/2011 | Shin | .................... | F04C 15/0042 417/220 |
| 2010/0296912 | A1 | 11/2010 | McCallum et al. | | |
| 2014/0360830 | A1 * | 12/2014 | Heverly | ................ | B64C 27/001 188/378 |
| 2015/0362396 | A1 * | 12/2015 | Thompson | .............. | G01M 1/36 73/468 |
| 2018/0347365 | A1 * | 12/2018 | Mochi | .................... | G01M 1/22 |

FOREIGN PATENT DOCUMENTS

| | | |
|---|---|---|
| CN | 101266182 A | 9/2008 |
| CN | 101915640 A | 12/2010 |
| CN | 114705363 A | 7/2022 |
| EP | 3276799 A1 | 1/2018 |

OTHER PUBLICATIONS

European Search Report and Written Opinion issued in Application Serial No. 24210516.1 dated Mar. 28, 2025; pp. 1-10.

* cited by examiner

*Primary Examiner* — Francis C Gray

(74) *Attorney, Agent, or Firm* — Armstrong Teasdale LLP

(57) ABSTRACT

A generator rotor shaft balancing system is disclosed. The generator rotor shaft balancing system includes a generator that includes a rotor and a rotor shaft. A weight is coupled to the rotor shaft. The weight is dynamically moveable, while the rotor is operating, to facilitate reducing vibrations in the rotor shaft.

11 Claims, 8 Drawing Sheets

500

COUPLE A MOVEABLE WEIGHT TO A ROTOR SHAFT OF A GENERATOR ASSEMBLY ⎯ 502

MONITOR VIBRATION WITHIN THE ROTOR SHAFT WHILE THE GENERATOR ASSEMBLY IS OPERATING ⎯ 504

TRANSMIT VIBRATION DATA TO A CONTROLLER ⎯ 506

SELECTIVELY CAUSE TO MOVE THE WEIGHT RELATIVE TO THE ROTOR SHAFT WHILE THE GENERATOR ASSEMBLY IS OPERATING ⎯ 508

METHODS AND APPARATUSES FOR REAL-TIME ROTOR BALANCING FOR A GENERATOR AND CONNECTED EQUIPMENT

BACKGROUND OF THE INVENTION

The present disclosure relates generally to methods and systems for real-time rotor balancing of a generator and connected equipment, and in particular, for real-time rotor balancing using a closed-loop control algorithm.

In modern industries, when producing electricity using a generator, a mover or a rotor of the generator is rotated using a gearbox connected to a gas turbine for certain application. The gas turbine transforms energy from a fuel or natural gas, into mechanical energy to rotate the rotor, and to match the synchronous condenser speed or to provide capability to engage or disengage, a gearbox connected with the generator rotor. While the generator rotor is being rotated at a high rotational speed, vibration can be created by unbalanced forces within the generator rotor. High vibration can drive to unit tips during operations, or over time causes cracks to develop in components of the rotor and/or the rotor shaft. Additionally, the cracks in the rotor shaft may create an imbalance in mass distribution in the rotor shaft, and, thereby, induce an increase in vibrations.

In order to alleviate vibrations within the rotor shaft, balancing weights are coupled to the rotor shaft. However, within known systems, the weights are fixed and are secured physically to the rotor; any change can be made when the unit is stopped. Further, any such change to the weights physically secured to the rotor requires time and sometimes additional tests.

Accordingly, a need exists for methods or techniques for rotor balancing that can facilitate reducing vibrational energy generated within a generator rotor in real-time.

SUMMARY

In one aspect, a generator rotor shaft balancing system is disclosed in which a generator includes a rotor and a rotor shaft. A weight is coupled to the rotor shaft. The weight coupled to the rotor shaft is dynamically moveable while the rotor is operating to facilitate reducing vibrations in the rotor shaft.

In another aspect, a method of balancing a generator rotor shaft is disclosed. The method includes coupling a moveable weight to a rotor shaft of a generator assembly and monitoring vibration within the rotor shaft while the generator assembly is operating. The method includes transmitting the vibration data to a controller and selectively causing, by the controller, to move the weight relative to the rotor shaft, while the generator assembly is operating, to facilitate reducing the vibrations in the rotor shaft.

DETAILED DESCRIPTION OF THE INVENTION

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
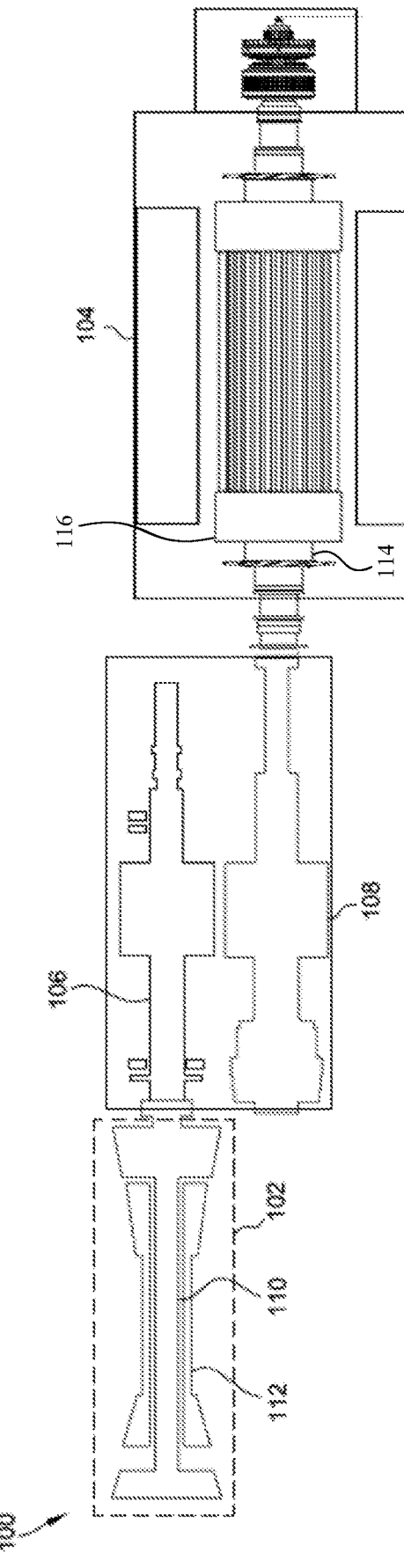
FIG. 1 illustrates a schematic diagram of an exemplary gas turbine connected to a gear box and a generator.

The embodiments described herein relate to various methods and systems that may be used for continuous or real-time rotor balancing to facilitate reducing vibrations in a rotor shaft of a generator. FIG. 1 illustrates an exemplary turbine system 100 in which a gas turbine (or a turbine assembly) 102 is coupled to a generator (or a generator assembly) 104 via a gear box 106 and a clutch 108. A shaft 110 of a rotor 112 of the gas turbine 102 is coupled with the gear box 106. The gear box 106 thus connects a low-speed shaft 110 coupled to a plurality of turbine blades (not shown) with a high-speed shaft 114 of a rotor 116 of the generator 104. The generator 104 and the gear box 106 form a drivetrain of the gas turbine 102. The gearbox 106 includes a series of gears (not shown) of varying sizes that convert rotation of the plurality of turbine blades (not shown) to a higher number of rotations per minute as required by the generator 104 to produce electricity.

The gas turbine 102 with the drivetrain (e.g., the generator 104 and the gear box 106) may be referenced herein as a powertrain. When the powertrain includes a clutch, such as clutch 108, and the gear box 106, different vibrational modes may occur each time the clutch 108 is engaged or disengaged depending on the relative positions of the clutch 108 and the gear box 106. Accordingly, a fixed rotor balancing system, i.e., known balancing systems that secure one or more weights of various masses at one or more fixed positions about the shaft 114, may not reduce vibrations in the shaft 114 that may occur during engagement and/or disengagement of the clutch 108. Unlike known systems, various embodiments described in the present disclosure may facilitate reducing vibrations generated by the shaft 114 during engagement and/or disengagement of the clutch 108 via a system that enables weights to be selectively moved about a circumference of the shaft 114, and within a plurality of axes along the shaft 114, while the powertrain remains in operation. In some embodiments, and by way of a non-limiting example, the turbine system may not include the gear box 106 and/or the clutch 108, and the gas turbine 102 may be directly coupled or connected with the generator 104.

More specifically, because of wear, damage, or build up on rotor components, for example, within known rotary assemblies, over time, a geometric center of the rotor shaft 114 and a center of mass of the rotor shaft 114 may shift and not coincide. Such a shift may induce vibrations into the shaft 114. In known systems, to reduce vibration of the shaft 114, a trial weight (or a balancing weight) may be added to the shaft 114 to intentionally shift the center of mass of the shaft 114 of the rotor. However, often additional trial weights may be necessary to balance the vibrational energy and to essentially coincide the center of mass of the shaft with the geometric center of the shaft. Such a process may be time-consuming and require additional tuning of the balancing weight wherein additional weight is added to the shaft, and/or the location of the balancing weight is changed.

Figure 2A:
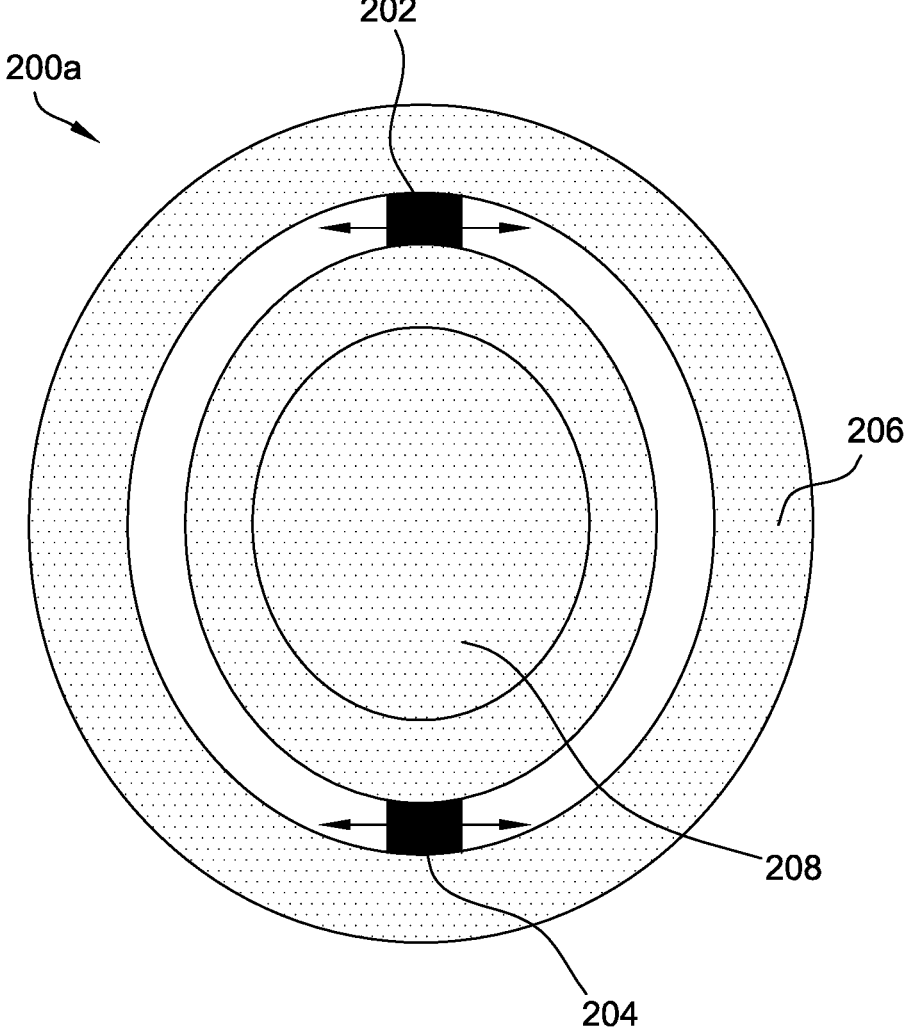
FIGS. 2A-2D illustrate exemplary schemes for dynamically moving weights to facilitate reducing vibrational energy in a shaft of a rotor of the generator.

FIGS. 2A-2D illustrate different schemes in which the weights may be selectively moved to facilitate reducing vibrations in the shaft 114 of the rotor 116 of the generator 104 (shown in FIG. 1). More specifically, FIG. 2A illustrates an exemplary scheme 200a in which weight(s) 202 and/or 204 may be selectively and dynamically added or eccentrically moved in real-time to different positions about a periphery of a rotor shaft 208. The weight(s) 202 and/or 204 may "reside," until selectively moved on a satellite wheel 206 mounted on the shaft 208. The satellite wheel 206 may translate axially along the shaft 208 and/or may rotate concurrently with the shaft 208. The weight(s) 202 and/or 204 may be dynamically moved in-real time based on a detected vibration pattern such that the vibrations induced within the shaft 208 are facilitated to be eliminated or reduced below a specific threshold value. In some embodiments, vibrations and/or vibration patterns may be detected using one or more sensors, such as but not limited to, an accelerometer, a velocity sensor, and/or a proximity sensor (none of which are shown in FIG. 2A). Sensor data received from the sensors may be transmitted to a controller (shown in FIG. 4 as 404) of a closed-loop control system used to continuously determine a proper position(s) for each moveable weight(s) 202 and/or 204. However, in alternative embodiments, more or less than two weights may be used.

Figure 2B:
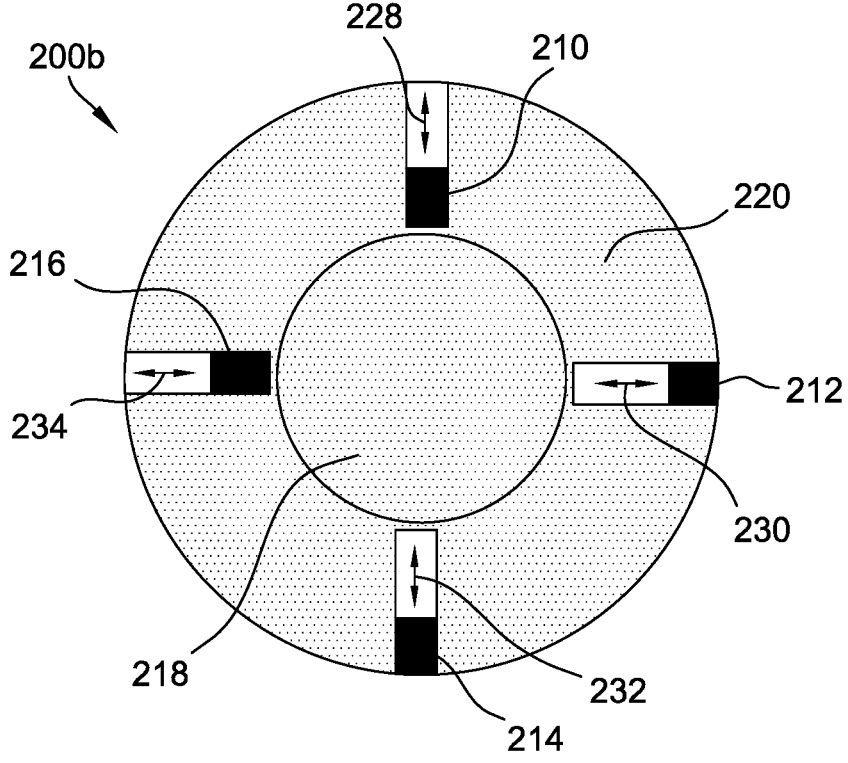

FIG. 2B illustrates an exemplary scheme 200b in which weight(s) 210, 212, 214, and/or 216 may be selectively and dynamically added or radially moved in real-time to different positions perpendicular to a rotor shaft 218. The weight(s) 210, 212, 214, and/or 216 may "reside," until selectively moved on a satellite wheel 220 mounted on the rotor shaft 218. The satellite wheel 220 may translate axially along the rotor shaft 218 and/or may rotate concurrently with the rotor shaft 218. The weight(s) 210, 212, 214, and/or 216 may be dynamically moved in real-time radially and perpendicular to the shaft 218 based on a detected vibration pattern such that the vibrations induced with the rotor shaft 218 are facilitated to be eliminated or reduced below a specific threshold value.

In some embodiments, vibrations and/or vibration patterns may be detected using one or more sensors, e.g., an accelerometer, a velocity sensor, and/or a proximity sensor (none of which are shown in FIG. 2B). Sensor data from the sensors may be transmitted to a controller (shown in FIG. 4 as 404) of a closed-loop control system used to continuously determine a proper position(s) for the weight(s) 210, 212, 214, and/or 216. Each of the weight(s) 210, 212, 214, and/or 216 is along a separate axis such as 228, 230, 232, and/or 234. Thus, in the exemplary embodiment, there are total of four axes for the weights 210, 212, 214, and 216. However, in alternative embodiments, more or less than four weights may be used and as such, a total number of axes may be more or less than four axes. As shown in FIG. 2B, each axis is separated by 90° from each adjacent axis. The angular separation of each axis will depend on the number of weights in the embodiments, so they are evenly distributed.

Figure 2C:
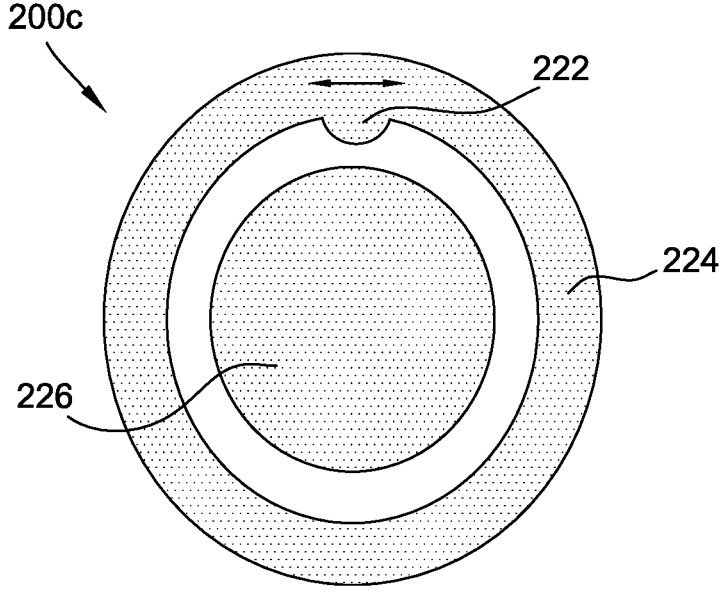

FIG. 2C illustrates an exemplary scheme 200c wherein a weight 222 on a satellite wheel 224 may be dynamically moved in real-time by being rotated to different rotational position relative to shaft 226. The weight 222 and the satellite wheel 224 are dynamically moveable in real-time and/or rotated based on the detected vibration pattern such that the vibrations are facilitated to be eliminated or reduced below a specific threshold value. In some embodiments, vibrations and/or vibration patterns may be detected using one or more sensors, such as, but not limited to, an accelerometer, a velocity sensor, and/or a proximity sensor (none of which are shown in FIG. 2C). Sensor data from the sensors may be transmitted to a controller (shown in FIG. 4 as 404) of a closed-loop control system used to continuously determine a proper position for the weight 222. In alternative embodiments, the system may include more than one weight that is rotationally moveable.

In some embodiments, in addition to the weight(s) described herein with reference to FIGS. 2A-2C, a permanent magnet generator (PMG) associated with a motor(s) may be used to displace, move, and/or rotate the weight(s), as determined by the controller of the closed-loop control system.

Figure 2D:
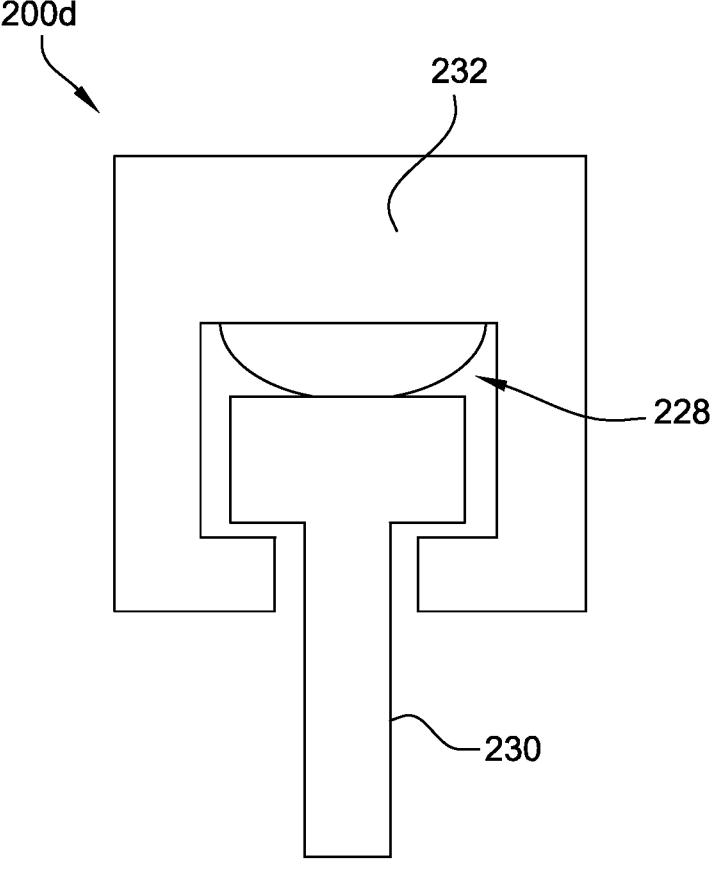

FIG. 2D illustrates an exemplary scheme 200d in which a weight 228 coupled to a rotor shaft 230 is selectively moved or displaced by a motor 232. In such an embodiment, the weight 228 is thus an external, motorized weight coupled to the rotor shaft 230. The weight 228 coupled to the shaft 230 may be a rubber wheel and the satellite wheel 224 may dynamically move the weight 228 in real-time based on the detected vibration pattern to facilitate eliminating or reducing vibrations to a level that is below a specific threshold value. In some embodiments, vibrations and/or vibration patterns may be detected using one or more sensors, such as, but not limited to, an accelerometer, a velocity sensor, and/or a proximity sensor (none of which are shown in FIG. 2D). Sensor data from the sensors may be transmitted to a controller (shown in FIG. 4 as 404) of a closed-loop control system used to continuously determine a proper position for the weight 222.

Figure 3A:
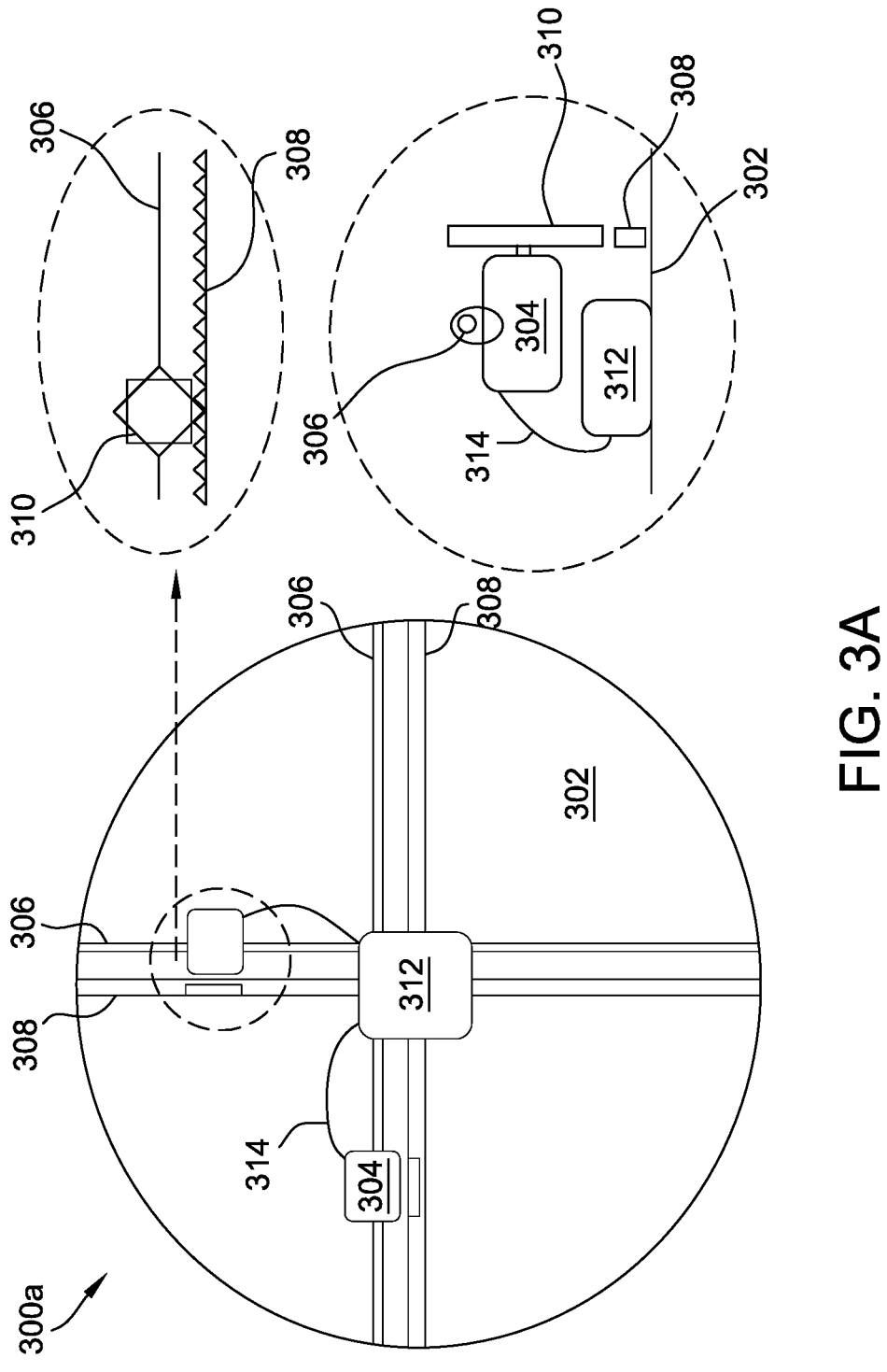
FIGS. 3A-3B illustrate exemplary high-level motor configurations for moving or displacing weights dynamically or in real-time for a rotor balancing system.
Figure 3B:
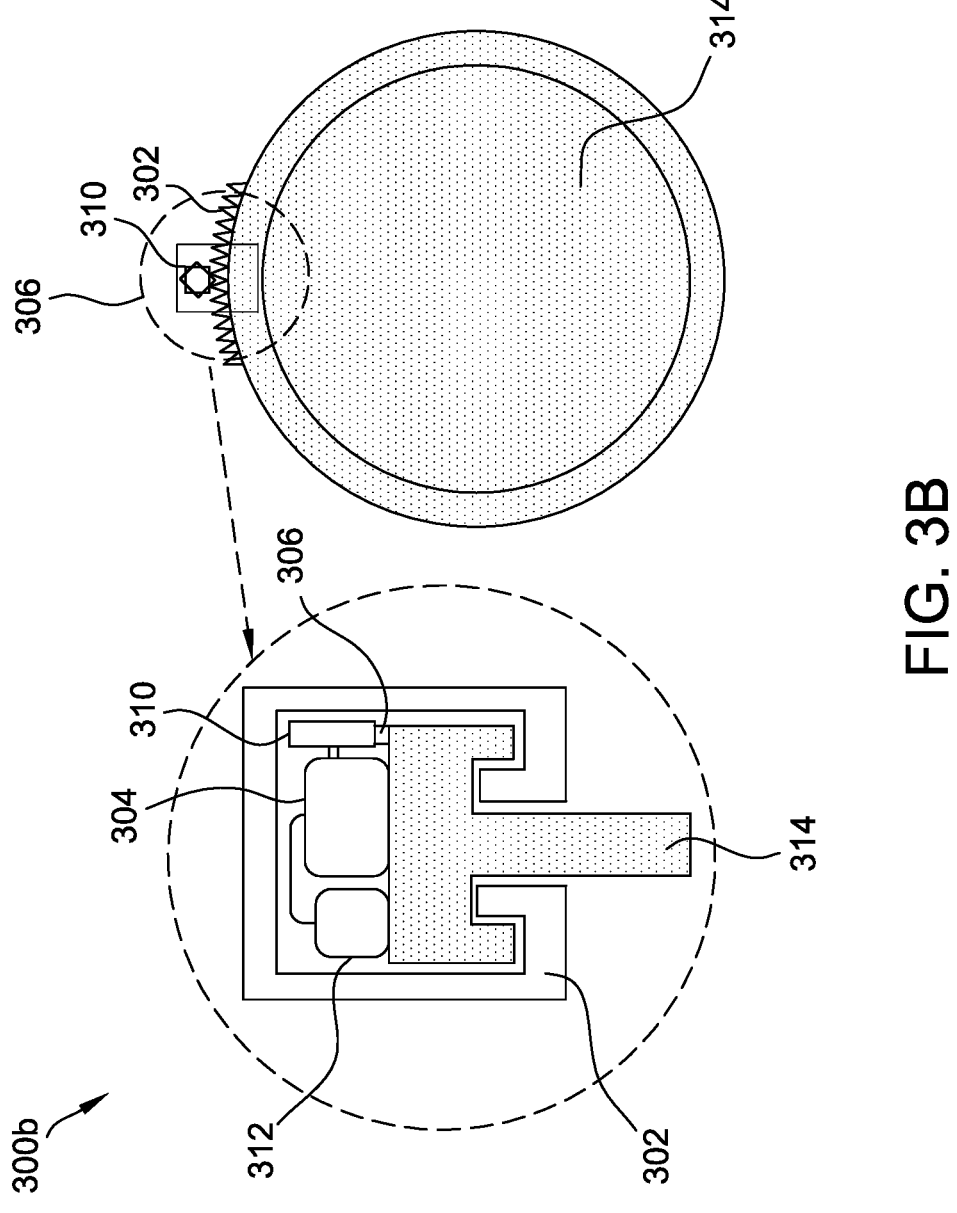

FIGS. 3A-3B illustrate exemplary high-level motor configurations used to selectively move or displace weights dynamically or in real-time to facilitate rotor balancing. In a motor configuration 300a, one or more motor displacement devices 304 are coupled to a satellite wheel 302. The one or more motor displacement devices 304 on the satellite wheel 302 may move or change their relative position on the satellite wheel 302 as motor gear 310 shifts its position along a guiding rail 306 and/or along a motor gear rail 308. The motor displacement device 304 may move based on a signal received by the motor displacement device 304 transmitted from a transceiver 312. The transceiver 312 may be communicatively coupled with the motor displacement device 304 via a connecting cable 314. By way of a non-limiting example, the transceiver 312 may be a wireless transceiver which may receive inputs to cause the motor displacement device 304 to move, transmitted from the controller (shown in FIG. 4 as 404) of the closed-loop control system.

In the motor configuration 300*b* (shown in FIG. 3B), a motor displacement device 304 is a weight 304 that is externally coupled to a rotor shaft (not shown in FIG. 3B) or a satellite wheel 302. The motor displacement device 304 on the satellite wheel 302 may selectively move or change the position of the weight 304 on the satellite wheel 302 as motor gear 310 changes its relative position along a guiding rail 306 and/or a motor gear rail 308. The motor displacement device 304 may selectively move based on a signal received by the motor displacement device 304 from a transceiver 312. The transceiver 312 may be communicatively coupled with the motor displacement device 304 via a connecting cable 314. Additionally, or alternatively, the transceiver 312 may be wirelessly coupled with the motor displacement device 304. By way of a non-limiting example, the transceiver 312 may be a wireless transceiver that may receive inputs, to cause the motor displacement device 304 to be selectively moved, transmitted from the controller (shown in FIG. 4 as 404) of the closed-loop control system.

Figure 4:
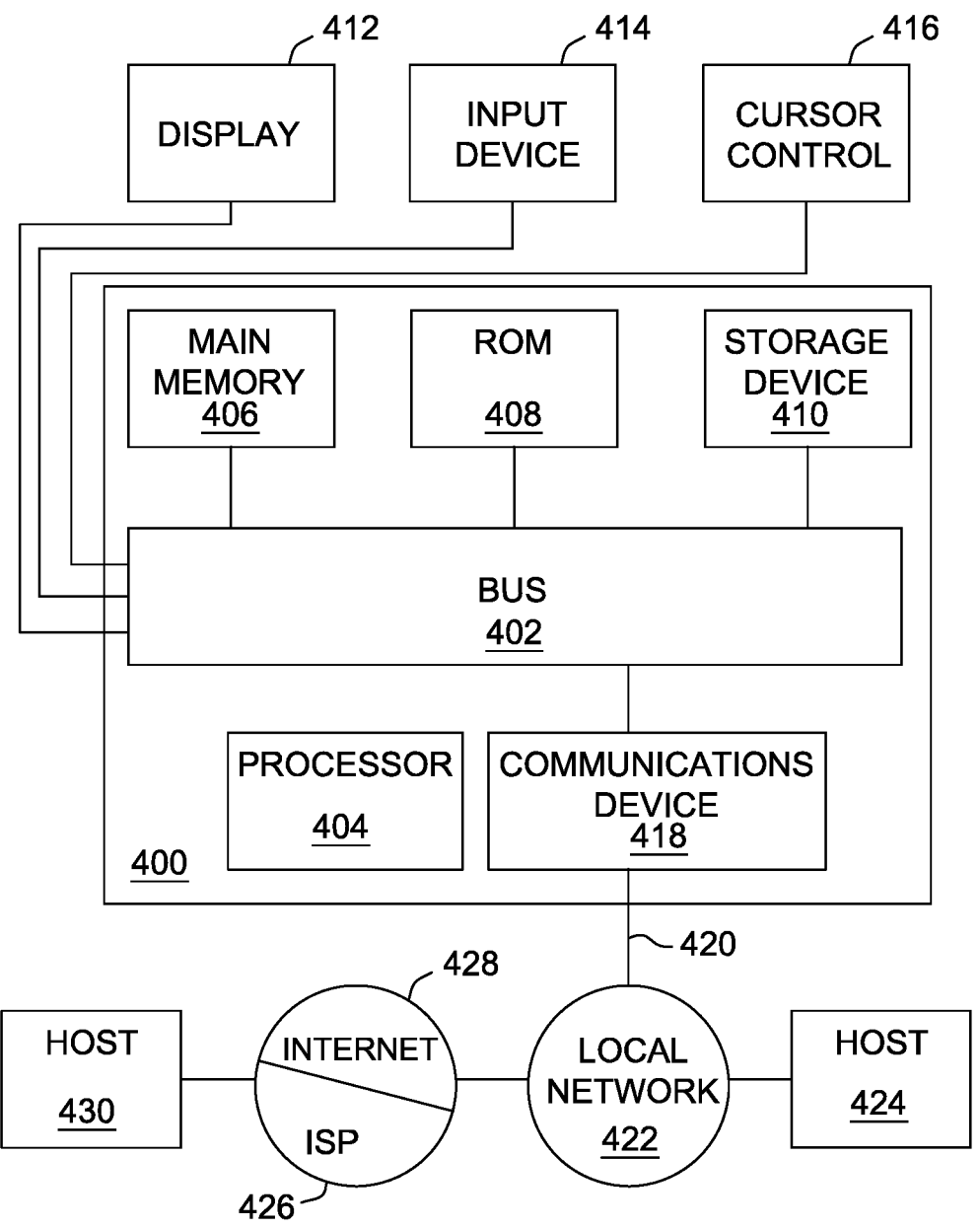
FIG. 4 illustrates a block diagram of exemplary computing equipment that may be used to implement a rotor balancing system.

FIG. 4 illustrates a block diagram of an exemplary computing equipment or an exemplary computer system 400 that may be used to implement a closed-loop control system described in the present disclosure. In the exemplary embodiment, computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406 such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, an optical disk, a flash memory storage device, and so on, is provided and coupled to bus 402 for storing information and instructions.

Computer system 400 may be coupled via bus 402 to a display 412, such as a liquid crystal display (LCD) for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., an X-axis) a second axis (e.g., a Y-axis), that allows the device to specify positions in a plane.

Computer system 400 may implement the techniques described herein using customized hard-wired logic, one or more application specific integrated circuits (ASICs) or field programmable gate arrays (FPGAs), firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, flash memory storage devices, etc., such as storage device 410. Volatile media includes dynamic memory, such as main memory 406. Common forms of storage media include, for example, a floppy disk, a flexible disk, a hard disk, a solid-state drive, magnetic tape, or any other magnetic data storage medium, a CD-ROM, any other optical data storage medium, any physical medium with patterns of holes, a RAM, a programmable ROM (PROM), and electrically programmable ROM (EPROM), a FLASH-EPROM, non-volatile RAM (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 402. Transmission media can also take the form of radio waves or light waves, such as those generated during radio-wave and infra-red data communications.

Various forms of media may be involved in carrying one or more instructions to processor 404 for execution. For example, the instructions may initially be carried on a magnetic disk or solid-state drive of a remote computer. The remote computer can load the instructions into the remote computer's dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or any type of modem to provide a data communication connection to a corresponding type of telephone line, cable line, and/or a fiber optic line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as Internet 428. Local network 422 and Internet 428 both use electrical, electro-magnetic or optical signals that carry digital data streams. The signals through the various networks and the signals on network link 420 and through communication interface 418, which carry the digital data to and from computer system 400, are example forms of transmission media.

The local network 422 may also include a network of sensors, e.g., vibration sensors, monitoring vibrations in the rotor shaft. The processor 404 may determine based upon the received data from the network of sensors, displacement of weights needed to reduce the vibrations to zero or within a specific threshold limit. The network of sensors may continuously or periodically measure vibrations in the rotor shaft and send the data to the processor 404. The processor continuously or periodically generates and transmits signals to move weights to particular positions to keep the vibrations within the specific threshold limit or zero. Accordingly, the computer system 400 represents the closed-loop control system described in the present disclosure.

Computer system 400 can transmit messages and receive data, including program code, via the network(s), network link 420, and/or communication interface 418. In the embodiment that includes the Internet, a server 430 might transmit a requested code for an application program through the Internet 428, ISP 426, local network 422, and/or communication interface 418. The received code may be executed by processor 404 as the code is received, and/or the received code may be stored in storage device 410, or other non-volatile storage for later execution.

Figure 5:
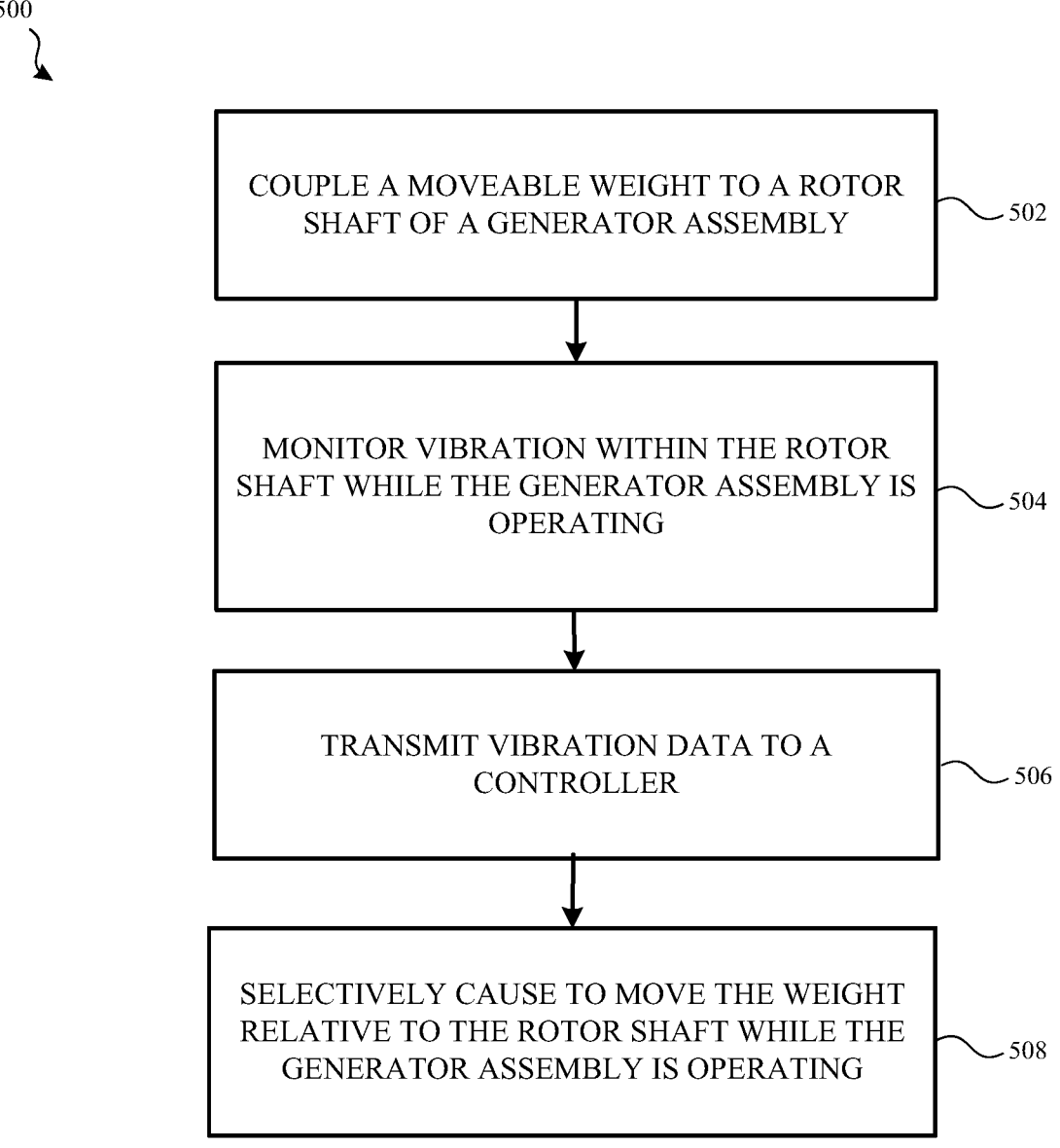
FIG. 5 illustrates an exemplary flow chart of a method for balancing a generator rotor shaft.

FIG. 5 illustrates a flow chart 500 of an exemplary method that may be implemented to facilitate balancing of a generator rotor shaft 114. A shown in the flow chart 500, the exemplary method includes coupling (502) a moveable weight to a rotor shaft of a generator assembly. The generator assembly may be as shown in FIG. 1 as 104, and the moveable weight may be coupled to the rotor shaft 114 as shown in any of FIGS. 2A-2D. Additionally, or alternatively, the moveable weight may be coupled to a satellite wheel coupled to the rotor shaft 114. The satellite wheel may move concurrently with the rotor shaft. In some embodiments, coupling (502) the moveable weight to the rotor shaft 114 may include coupling an external motorized weight to the rotor shaft as shown in FIG. 2D, and coupling a drive motor to the external motorized weight as shown in FIG. 3B. The drive motor or a motor may cause the external motorized weight or the moveable weight to move along at least one of a guide rail or a gear rail as shown in FIG. 3A and/or FIG. 3B.

The method includes monitoring (504) vibration within the rotor shaft 114 while the generator assembly 104 is operating. The vibration may be monitored using a network of one or more sensors coupled to the rotor shaft 114. By way of a non-limiting example, the network of one or more sensors may include at least one of an accelerometer, a velocity sensor, and/or a proximity sensor. The method includes transmitting (506) vibration data to a controller shown in FIG. 4 as 404.

The controller compares the vibration data to a predefined threshold, and selectively causes (508) the weight to move relative to the rotor shaft 114, while the generator assembly 104 is operating. The controller thus facilitates reducing the vibrations in the rotor shaft 114. In some embodiments, and by way of a non-limiting example, the controller may cause selectively moving the moveable weight relative to the satellite wheel and the rotor shaft. In some embodiments, the moveable weight is selectively moved substantially eccentrically about a periphery of the rotor shaft, as shown in FIG. 2A, while the generator assembly is operating. In some embodiments, the moveable weight is selectively moved substantially radially and perpendicularly relative to the rotor shaft, as shown in FIG. 2B, while the generator assembly is operating. By way of a non-limiting example, the weight may be moved along at least one of a plurality axes, where adjacent pairs of axes are separated by 90°. Depending on a total number axis, adjacent pairs of axes may be separated by an angle other than 90°.

Exemplary rotor shaft balancing system and method for balancing a generator rotor shaft are described herein. The exemplary rotor shar balancing system and method for balancing a generator rotor shaft provide several advantages over known systems and processes for rotor shaft balancing, including, at least, minimizing off time of the generator for additional tuning of the balancing weight during which additional weight may be added to the shaft and/or a location of the balancing weight is changed.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems described herein are not limited to the specific embodiments described herein, but rather portions of the various systems may be utilized independently and separately from other systems described herein.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the invention are provided by the subject matter of the following clauses:

A generator rotor shaft balancing system comprising: a generator including a rotor and a rotor shaft; and a weight coupled to the rotor shaft, the weight is dynamically moveable, while the rotor is operating, to facilitate reducing vibrations in the rotor shaft.

The generator rotor shaft balancing system in accordance with any of the preceding clauses, wherein the weight is configured to move eccentrically to different positions about a periphery of the rotor shaft.

The generator rotor shaft balancing system in accordance with any of the preceding clauses, further comprising a satellite wheel coupled to the rotor shaft such that the satellite wheel moves concurrently with the rotor shaft, the weight is moveable coupled to the satellite wheel.

The generator rotor shaft balancing system in accordance with any of the preceding clauses, wherein the weight moveable radially and perpendicularly to the rotor shaft along an axis.

The generator rotor shaft balancing system in accordance with any of the preceding clauses, wherein the weight is selectively moveable along any of a plurality of axes, wherein each set of adjacent axes axis is separated by 90°.

The generator rotor shaft balancing system in accordance with any of the preceding clauses, wherein the weight is an external motorized weight coupled to the rotor shaft.

The generator rotor shaft balancing system in accordance with any of the preceding clauses, further comprising a motor configured to move the weight along at least one of a guide rail or a gear rail.

The generator rotor shaft balancing system in accordance with any of the preceding clauses, further comprising a controller couped within a closed-loop control system, the controller receives vibration data from at least one sensor coupled to the rotor shaft, and selectively causes the weight to move based on the received vibration data.

The generator rotor shaft balancing system in accordance with any of the preceding clauses, wherein the controller compares the vibration data to a pre-defined threshold and selectively moves the weight to facilitate reducing vibrations in the rotor shaft.

The generator rotor shaft balancing system in accordance with any of the preceding clauses, wherein the controller receives the vibration data from a plurality of sensors including at least one of an accelerometer, a velocity sensor, and a proximity sensor.

The generator rotor shaft balancing system in accordance with any of the preceding clauses, wherein the generator is coupled or connected with a turbine via a gear box and a clutch.

A method of balancing a generator rotor shaft, the method comprising: coupling a moveable weight to a rotor shaft of a generator assembly; monitoring vibration within the rotor shaft while the generator assembly is operating; transmitting vibration data to a controller; and selectively causing, by the controller, to move the weight relative to the rotor shaft, while the generator assembly is operating, to facilitate reducing the vibrations in the rotor shaft.

The method in accordance with any of the preceding clauses, further comprising: coupling a satellite wheel to the rotor shaft such that the satellite wheel moves concurrently with the rotor shaft; coupling the moveable weight to the satellite wheel; and selectively moving the moveable weight relative to the satellite wheel and to the rotor shaft to facilitate reducing vibrations in the rotor shaft.

The method in accordance with any of the preceding clauses, further comprising selectively moving the moveable weight substantially eccentrically about a periphery of the rotor shaft while the generator assembly is operating.

The method in accordance with any of the preceding clauses, further comprising selectively moving the moveable weight substantially radially and perpendicularly relative to the rotor shaft while the generator assembly is operating.

The method in accordance with any of the preceding clauses, wherein selectively moving the weight comprises selectively moving the weight along at least one of a plurality of axes, wherein adjacent pairs of axes are separated by 90°.

The method in accordance with any of the preceding clauses, wherein coupling the moveable weight to the rotor shaft further comprises: coupling an external motorized weight to the rotor shaft; and coupling a drive motor to the external motorized weight to selectively move the weight along at least one of guide rail and a gear rail.

The method in accordance with any of the preceding clauses, wherein transmitting the vibration data to the controller further comprise transmitting the vibration data to the controller coupled within a closed-loop system.

The method in accordance with any of the preceding clauses, further comprising: comparing, by the controller, the vibration data to a pre-defined threshold; and causing, by the controller, to selective move the weight to facilitate reducing vibrations in the rotor shaft.

The method in accordance with any of the preceding clauses, wherein monitoring the vibration within the rotor shaft while the generator assembly is operating further comprises coupling at least one of an accelerometer, a velocity sensor, and a proximity sensor to the rotor shaft.

The method in accordance with any of the preceding clauses, further comprising selectively causing the weight to move along at least one a guide rail or a gear rail by a motor.

While the invention has been described in terms of various specific embodiments, those skilled in the art will recognize that the invention can be practiced with modification within the spirit and scope of the claims.

What is claimed is:

1. A generator rotor shaft balancing system comprising:
a generator including a rotor and a rotor shaft; and
a weight coupled to the rotor shaft;
wherein the weight is dynamically moveable, while the rotor is operating, to facilitate reducing vibrations in the rotor shaft; and
wherein the weight is configured to move eccentrically to different positions about a periphery of the rotor shaft.

2. The generator rotor shaft balancing system of claim 1, further comprising a satellite wheel coupled to the rotor shaft such that the satellite wheel moves concurrently with the rotor shaft, and wherein the weight is moveable coupled to the satellite wheel.

3. The generator rotor shaft balancing system of claim 1, further comprising a controller couped within a closed-loop control system, wherein the controller receives vibration data from at least one sensor coupled to the rotor shaft and selectively causes the weight to move based on the received vibration data.

4. The generator rotor shaft balancing system of claim 3, wherein the controller compares the vibration data to a pre-defined threshold and selectively moves the weight to facilitate reducing vibrations in the rotor shaft.

5. The generator rotor shaft balancing system of claim 3, wherein the controller receives the vibration data from a plurality of sensors including at least one of an accelerometer, a velocity sensor, and a proximity sensor.

6. The generator rotor shaft balancing system of claim 1, wherein the generator is coupled or connected with a turbine via a gear box and a clutch.

7. A method of balancing a generator rotor shaft, the method comprising:
coupling a moveable weight to a rotor shaft of a generator assembly;
monitoring vibration within the rotor shaft while the generator assembly is operating;
transmitting vibration data to a controller; and
selectively causing, by the controller, to eccentrically move the weight relative to the rotor shaft to position the weight about a periphery of the rotor shaft, while the generator assembly is operating, to facilitate reducing the vibrations in the rotor shaft.

11

8. The method of claim 7, further comprising:

coupling a satellite wheel to the rotor shaft such that the satellite wheel moves concurrently with the rotor shaft;

coupling the moveable weight to the satellite wheel; and selectively moving the moveable weight relative to the satellite wheel and to the rotor shaft to facilitate reducing vibrations in the rotor shaft.

9. The method of claim 7, wherein transmitting the vibration data to the controller further comprise transmitting the vibration data to the controller coupled within a closed-loop system.

10. The method of claim 7, further comprising:

comparing, by the controller, the vibration data to a pre-defined threshold; and causing, by the controller, to selective move the weight to facilitate reducing vibrations in the rotor shaft.

11. The method of claim 7, wherein monitoring the vibration within the rotor shaft while the generator assembly is operating further comprises coupling at least one of an accelerometer, a velocity sensor, and a proximity sensor to the rotor shaft.

\* \* \* \* \*